US011964791B2

(12) United States Patent
Lambert

(10) Patent No.: US 11,964,791 B2
(45) Date of Patent: Apr. 23, 2024

(54) EMPTYING STATION FOR A FLEXIBLE INTERMEDIATE BULK CONTAINER

(71) Applicant: 10039322 CANADA INC., Val-d'Or (CA)

(72) Inventor: Luc Lambert, Val-d'Or (CA)

(73) Assignee: 10039322 CANADA INC., Val-d'Or (CA)

(*) Notice: Subject to any disclaimer, the term of this patent is extended or adjusted under 35 U.S.C. 154(b) by 448 days.

(21) Appl. No.: 17/231,768

(22) Filed: Apr. 15, 2021

(65) Prior Publication Data

US 2021/0323712 A1 Oct. 21, 2021

Related U.S. Application Data

(60) Provisional application No. 63/010,221, filed on Apr. 15, 2020.

(51) Int. Cl.
*B65B 69/00* (2006.01)
*B28C 7/06* (2006.01)

(52) U.S. Cl.
CPC .......... *B65B 69/0083* (2013.01); *B28C 7/064* (2013.01); *B65B 69/0033* (2013.01); *B65B 69/005* (2013.01)

(58) Field of Classification Search
CPC .............. B65B 69/005; B65B 69/0075; B65B 69/0083; B25C 7/064
USPC .......................................................... 141/330
See application file for complete search history.

(56) References Cited

U.S. PATENT DOCUMENTS 4,527,716 A * 7/1985 Haas ...................... B65G 65/40 414/412
4,953,752 A 9/1990 Tousignant et al.
4,997,284 A 3/1991 Tousignant et al.
5,405,053 A 4/1995 Zublin
5,415,323 A 5/1995 Fenelon
5,743,313 A * 4/1998 Josefsson ............ B65B 69/0075 141/330
5,813,192 A * 9/1998 White ................ B65B 69/0008 53/381.2

(Continued)

FOREIGN PATENT DOCUMENTS

AU 2015268606 A1 6/2016
CN 104097260 A 10/2014

(Continued)

*Primary Examiner* — Timothy L Maust
(74) *Attorney, Agent, or Firm* — BCF LLP

(57) ABSTRACT

An emptying station for a flexible intermediate bulk container (FIBC) is provided. The emptying station has a body having a front wall, a rear wall defining an aperture, and left and right side walls, the walls collectively defining a hopper for receiving particulate matter contained in the FIBC, at least one power source connected to the body, a lift assembly operatively connected to the at least one power source and to the body. The lift assembly moves the FIBC between lowered and raised positions. A cutter is connected to the body and is disposed in the hopper. The cutter is positioned for cutting a bottom of the FIBC when moved from the lowered position to the raised position. At least one mixer is connected to the body for mixing the particulate matter received in the hopper. The at least one mixer also conveys the particulate matter towards the rear wall.

25 Claims, 9 Drawing Sheets

(56) References Cited

U.S. PATENT DOCUMENTS

| | | | | |
|---|---|---|---|---|
| 5,927,352 | A * | 7/1999 | Wouters | B65B 69/0008 141/330 |
| 6,293,318 | B1 | 9/2001 | Ehrlich et al. | |
| 10,500,326 | B2 * | 12/2019 | Gillespie | B65B 69/0091 |
| 10,946,129 | B2 * | 3/2021 | Gillespie | B65B 69/0008 |
| 2008/0050211 | A1 | 2/2008 | Showalter | |
| 2009/0177313 | A1 * | 7/2009 | Heller | B28C 9/049 700/214 |
| 2014/0029872 | A1 | 1/2014 | Ness | |

FOREIGN PATENT DOCUMENTS

| | | | | | |
|---|---|---|---|---|---|
| CN | 104097261 | A | | 10/2014 | |
| CN | 203978345 | U | * | 12/2014 | |
| CN | 203978345 | U | | 12/2014 | |
| CN | 204054352 | U | | 12/2014 | |
| CN | 104827576 | A | | 8/2015 | |
| CN | 104118058 | B | | 2/2017 | |
| CN | 206393826 | U | | 8/2017 | |
| CN | 112849614 | A | * | 5/2021 | |
| EP | 2937291 | B1 | | 1/2017 | |
| FR | 2797438 | A1 | * | 2/2001 | B65B 69/0075 |
| GB | 2073603 | A | | 10/1981 | |
| JP | H06329135 | A | | 11/1994 | |
| JP | 2002096318 | A | | 4/2002 | |
| WO | 2016009454 | A1 | | 1/2016 | |

* cited by examiner

EMPTYING STATION FOR A FLEXIBLE INTERMEDIATE BULK CONTAINER

CROSS-REFERENCE

The present application claims priority to U.S. Provisional Patent Application No. 63/010,221 filed Apr. 15, 2020, entitled "*Emptying Station For A Flexible Intermediate Bulk Container*", the entirety of which is incorporated herein.

FIELD OF TECHNOLOGY

The present technology relates to emptying stations for flexible intermediate bulk containers containing particulate matter.

BACKGROUND

In a mine gallery (or in other closed work environments), it is often impossible to feed wet concrete from the surface and to pour it on site, whether in molds or at the desired location. Constituents of concrete have to be mixed and prepared as wet concrete in the mine gallery. To carry around and stockpile the dry constituents of concrete, flexible intermediate bulk containers or FIBC (also known as bulk bags, or jumbo bags) are used.

In order to prepare concrete from constituents contained in bulk bags, the bulk bags are typically lifted up using a crane (or using an overhead beam having a hoist mounted thereto), and an operator has to manually cut open the bottom of the bulk bag to empty the content of the bulk bag into a mixer. This process can be hazardous for the operator and generates a lot of dust, which is undesirable in a closed work environment such as a mine gallery.

Although there exists emptying stations for bulk bags having cutters designed to open the bulk bags as the bulk bags are lowered on the cutters, the emptying stations require a crane or some kind of overhead equipment having a hoist mounted thereto to lift and lower the bulk bags on the cutters. Documents U.S. Pat. No. 5,405,053A and AU2015268606A1 describe such emptying stations. In addition to the emptying station, a separate mixer is needed to prepare the wet concrete from the constituents contained in the bulk bag that is cut open. However, in a mine gallery, installing such emptying stations is costly as they require the installations of a crane or overhead equipment, and generally require a mine gallery having a ceiling of over 9 feet tall (or about 2.74 meters). Moreover, moving such emptying stations and their associated mixer from one location to another, even in the same mine gallery, is also costly and time consuming due to the necessary installation of the crane or overhead equipment, and to the number of components to carry around and deploy.

Therefore, there is a desire for emptying stations that would improve the safety of the process of emptying bulk bags while reducing the cost and complexity of installation on work site and facilitating the preparation of wet concrete from the constituents contained in the bulk bags.

SUMMARY

It is an object of the present technology to ameliorate at least some of the inconveniences present in the prior art.

In some circumstances, the present technology facilitates not only the emptying of flexible intermediate bulk containers, but also the mixing of the particulate matter contained therein for preparation of wet concrete. The emptying station has a lift assembly that cuts open the bottom of a flexible intermediate bulk container during the upward motion of the flexible intermediate bulk container above a hopper of the emptying station. Cutting open the flexible intermediate bulk container during the upward motion of the lift assembly permits to operate the emptying station in a closed environment that has a relatively low ceiling, such as in a mine gallery. Moreover, the emptying station of the present technology can mix and prepare wet concrete at an appreciable rate enabling continuous feeding of wet concrete.

Furthermore, emptying stations in accordance with the present technology can conveniently be disposed inside a shipping container not only for transportation or storage, but also during operation. Having an emptying station in accordance with the present technology disposed inside a shipping container further reduces the amount of dust that can be generated during the emptying of flexible intermediate bulk containers, reduce risk of injury of nearby workers due to moving parts of the emptying station, and facilitates the transport and deployment of the emptying station on a job site.

These features and additional features of the present technology will be described in more details below.

According to one aspect of the present technology, there is provided an emptying station for a flexible intermediate bulk container. The emptying station has: a body having a front wall, a rear wall defining an aperture, and left and right side walls extending longitudinally between the front and rear walls, the front wall, the rear wall and the left and right side walls collectively defining a hopper for receiving particulate matter contained in the flexible intermediate bulk container; at least one power source connected to the body; a lift assembly operatively connected to the at least one power source and to the body, the lift assembly moving the flexible intermediate bulk container relative to the body between a lowered position and a raised position; a cutter connected to the body and being disposed in the hopper, the cutter being positioned for cutting a bottom of the flexible intermediate bulk container when moved from the lowered position to the raised position; and at least one mixer connected to the body for mixing the particulate matter received in the hopper, the at least one mixer further conveying the particulate matter towards the rear wall.

In some embodiments, the cutter is positioned for cutting the bottom of the flexible intermediate bulk container when moved longitudinally from forward of the front wall to rearward of the front wall.

In some embodiments, the cutter includes a plurality of spikes extending generally horizontally and being disposed at the rear of the front wall, the plurality of spikes pointing towards the front wall.

In some embodiments, at least one of the rear wall, the right side wall and the left side wall extends vertically higher than the front wall.

In some embodiments, the at least one mixer includes a vibrating screen located in the hopper, the vibrating screen being operatively connected to the at least one power source.

In some embodiments, the vibrating screen has a front portion and a rear portion, and at least one pivot disposed longitudinally between the front and rear portions, the at least one pivot defining a laterally extending pivot axis, the at least one pivot pivotally connecting the vibrating screen to the body, and the front and rear portions being pivotable upwardly and downwardly about the pivot axis.

In some embodiments, the vibrating screen is slanted upwardly from the front wall to the rear wall of the body.

In some embodiments, the at least one mixer includes a first mixer having a first screw being slanted upwardly from the front wall to the rear wall of the body, the first screw extending at least partially in the aperture defined in the rear wall. The emptying station further includes a second mixer located at the rear of the rear wall. The second mixer includes: a conduit connected to the body and extending away from the rear wall, the conduit including an inlet and a nozzle, and a second screw extending in the conduit and being slanted upwardly from the inlet to the nozzle, the second screw further mixing the particulate matter received in the conduit through the inlet and conveying the particulate matter from the inlet to the nozzle.

In some embodiments, the first screw has a first pitch and the second screw has a second pitch, the second pitch being different of the first pitch.

In some embodiments, the first screw has a first flight diameter and the second screw has a second flight diameter, the second flight diameter being different of the first flight diameter.

In some embodiments, the second mixer includes a water injection port located nearer to the inlet than to the nozzle.

In some embodiments, the at least one power source includes a first motor and a second motor, the first motor driving the first mixer and the lift assembly, and the second motor driving the second mixer.

In some embodiments, the second mixer further has a collector connected to the rear wall of the body, the collector defining a chamber for receiving particulate matter flowing through the aperture defined in the rear wall and for directing the particulate matter into the inlet of the conduit, the collector further including a dust extractor fluidly connected to the chamber.

In some embodiments, the second mixer is selectively pivotable relative to the body about a vertically extending pivot axis.

In some embodiments, the lift assembly includes: at least one lift arm pivotally connected to the body and structured for lifting the flexible intermediate bulk container in the hopper from forward of the front wall to above and rearward of the front wall; and at least one actuator pivotally connected between the at least one lift arm and the body, the at least one actuator being driven by the at least one power source.

In some embodiments, the at least one lift arm has a proximal portion and a distal portion, and the distal portion is selectively extendible relative to the proximal portion.

In some embodiments, the proximal portion and the distal portion define a L-shape.

In some embodiments, the distal portion includes at least one hook for engaging at least one loop of the flexible intermediate bulk container.

In some embodiments, the at least one lift arm includes a left lift arm and a right lift arm, and the at least one actuator includes a left actuator and a right actuator, the left actuator being pivotally connected between the left side wall and the left lift arm, and the right actuator being pivotally connected between the right side wall and the right lift arm.

According to another aspect of the present technology, there is provided a shipping container containing the above emptying station according to one or more of the above embodiments.

According to one aspect of the present technology, there is provided an emptying station for a flexible intermediate bulk container. The emptying station has: a body having a front wall, a rear wall defining an aperture, and left and right side walls extending between the front and rear walls, the front wall, the rear wall and the left and right side walls collectively defining a hopper for receiving particulate matter contained in the flexible intermediate bulk container; at least one power source connected to the body; a lift assembly operatively connected to the at least one power source and to the body, the lift assembly moving the flexible intermediate bulk container relative to the body between a lowered position and a raised position; a cutter connected to the body and being disposed in the hopper, the cutter being positioned for cutting a bottom of the flexible intermediate bulk container when moved from the lowered position to the raised position; and at least one mixer connected to the body for mixing the particulate matter received in the hopper, the at least one mixer further conveying the particulate matter towards the rear wall, the at least one mixer being slanted upwardly from the front wall to the rear wall of the body.

In some embodiments, the at least one mixer further comprises a vibrating screen located in the hopper and being slanted upwardly from the front wall to the rear wall of the body.

In some embodiments, the at least one mixer includes a first mixer having a first screw being slanted upwardly from the front wall to the rear wall of the body, the first screw extending at least partially in the aperture defined in the rear wall. The emptying station further includes a second mixer located at the rear of the rear wall. The second mixer includes: a conduit connected to the body and extending away from the rear wall, the conduit including an inlet and a nozzle, and a second screw extending in the conduit and being slanted upwardly from the inlet to the nozzle, the second screw further mixing the particulate matter received in the conduit through the inlet and conveying the particulate matter from the inlet to the nozzle.

In some embodiments, the vibrating screen defines a plane, the first screw defines a first screw axis, and the first screw axis is parallel to the plane.

In some embodiments, the first mixer is a dry mixer, and the second mixer is a wet mixer.

For purposes of the present application, terms related to spatial orientation such as front, rear, left and right should be understood as they would normally be understood by an operator of the emptying station standing in the bulk bag loading area and facing the hopper.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The accompanying Figures illustrate one embodiment of an emptying station 20 in accordance with the present technology that is designed to empty and mix concrete constituents contained in a flexible intermediate bulk container 22 (hereinafter "FIBC"). The content of the FIBC 22 is particulate matter containing cement, filler materials (ex. gravel), and other constituents of concrete (such as calcium). It is to be noted that the present emptying station 20 could be adapted to empty FIBCs 22 containing particulate matter other than concrete constituents, and mix this particulate matter for another use.

Figure 1:
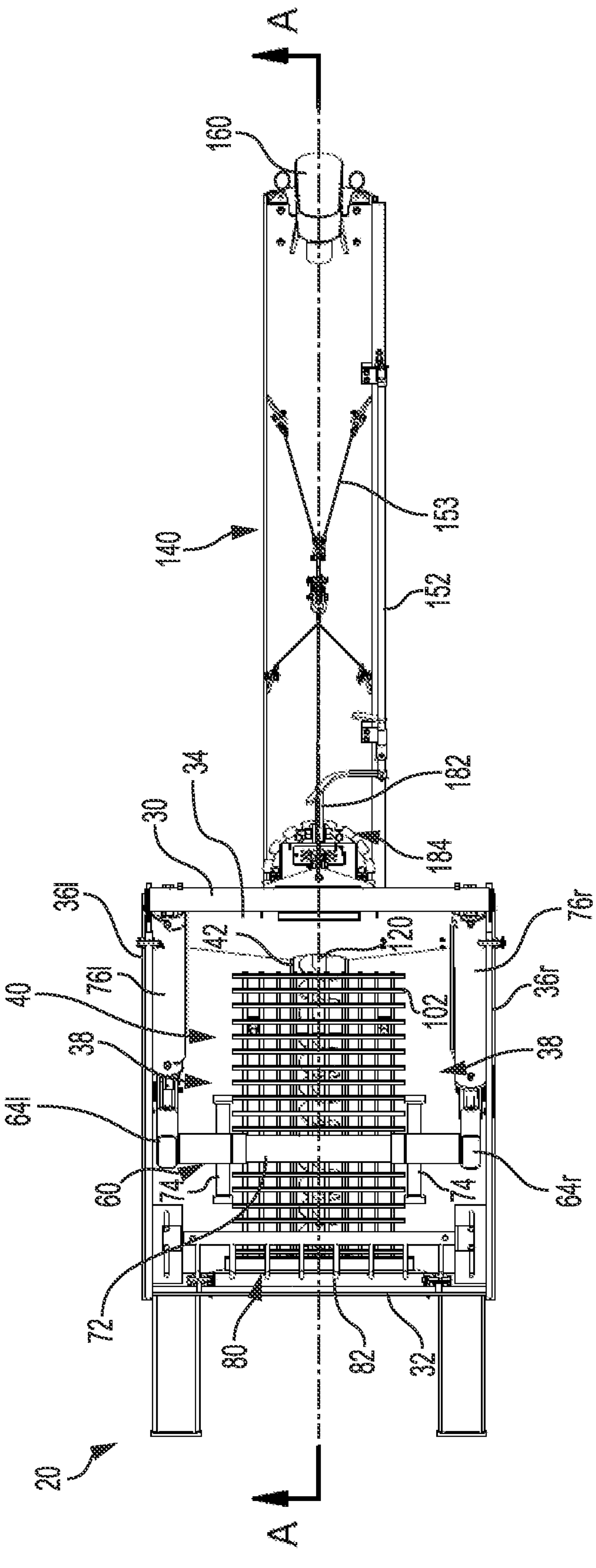
FIG. 1 is a top plan view of an emptying station for a flexible intermediate bulk container in accordance with one embodiment of the present technology.
Figure 2:
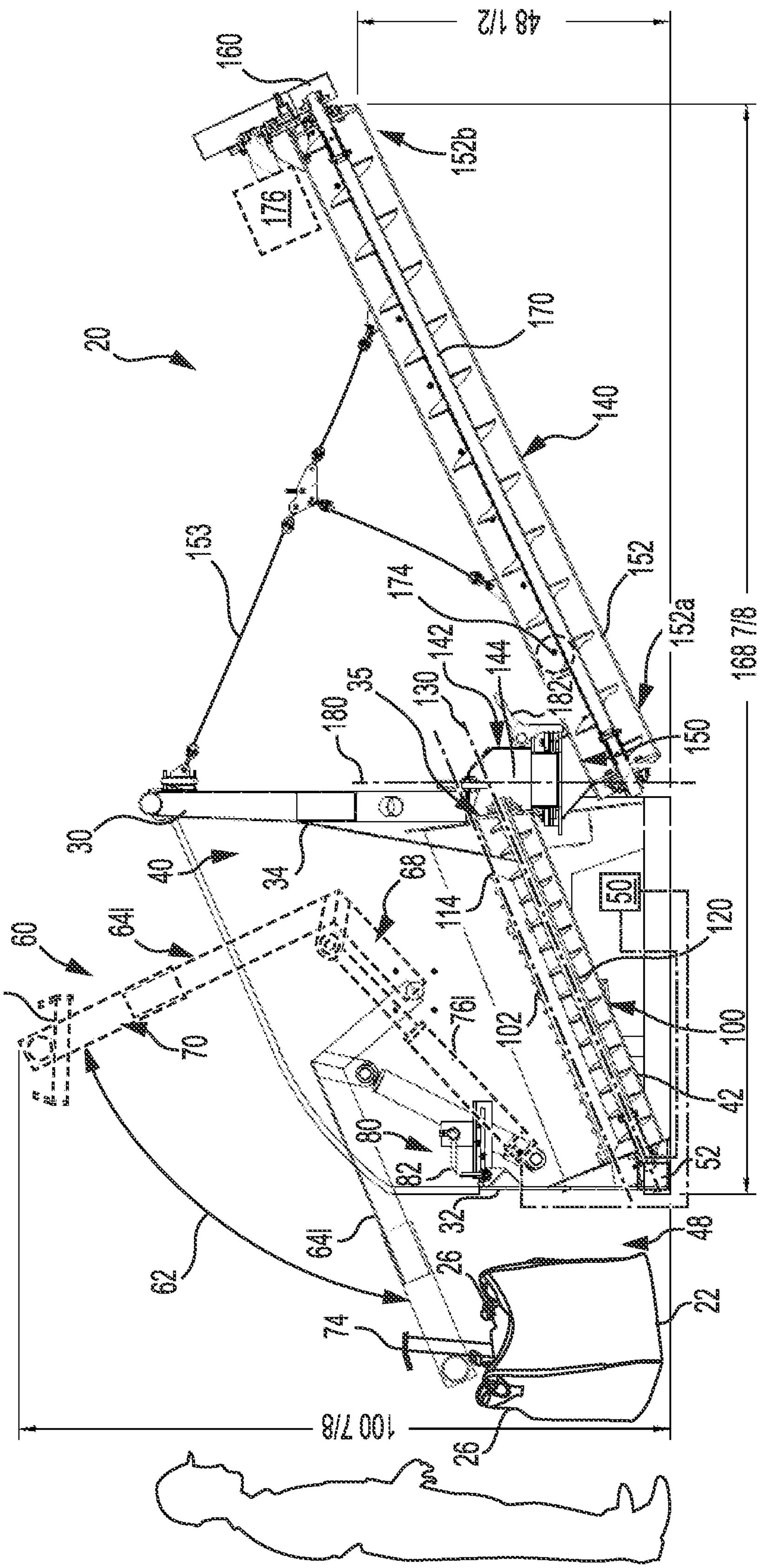
FIG. 2 is a cross-sectional view of the emptying station of FIG. 1 taken along cross-section line A-A of FIG. 1, with an operator standing in front of the emptying station and with a flexible intermediate bulk container disposed in a loading area.

Generally described and referring to FIGS. 1 and 2, the emptying station 20 includes a body 30 having a hopper 40 for receiving particulate matter contained in the HEW 22, and a power source 50 connected to the body 30. The power source 50 is a hydraulic unit, but could be another type of power source in other embodiments. A lift assembly 60 is operatively connected to the hydraulic unit 50 and to the body 30. The lift assembly 60 moves the HEW 22 relative to the body 30 between a lowered position and a raised position (see double arrow 62 in FIG. 2). A cutter 80 is connected to the body 30 and is disposed in the hopper 40. The cutter 80 is positioned for cutting a bottom 24 of the HEW 22 (FIGS. 10 and 11) when the FIBC 22 is moved from the lowered position to the raised position. The emptying station 20 further includes a dry mixer 100 for dry mixing the particulate matter received in the hopper 40 through gravity, and the dry mixer 100 further conveys the particulate matter towards a wet mixer 140 where the particulate matter is mixed with water to form wet concrete. Wet concrete is dispensed at a nozzle 160 of the wet mixer 140. The different components of the emptying station 20 will now be described in detail.

Referring to FIGS. 1 to 5, the body 30 has a front wall 32, a rear wall 34 defining an aperture 35 (FIG. 4), and left and right side walls **36*l*, 36*r* extending longitudinally between the front wall 32 and the rear wall 32. The front wall 32, the rear wall 34 and the left and right side walls 36*l*, 36*r* collectively define the hopper 40. It is to be noted that the rear wall 34 and the left and right side walls 36*l*, 36*r* extend vertically higher than the front wall 32 so as to better contain the particulate matter flowing from the FIBC 22 within the hopper 40. The rear wall 34 and the left and right side walls 36*l*, 36*r* could extend otherwise in other embodiments, and could be replaced by one continuous semi-circular wall for example. The left and right side walls 36*l*, 36*r* have converging lower portions 38, and a slanted trough 42 is defined at the bottom of the hopper 40**.

Figure 5:
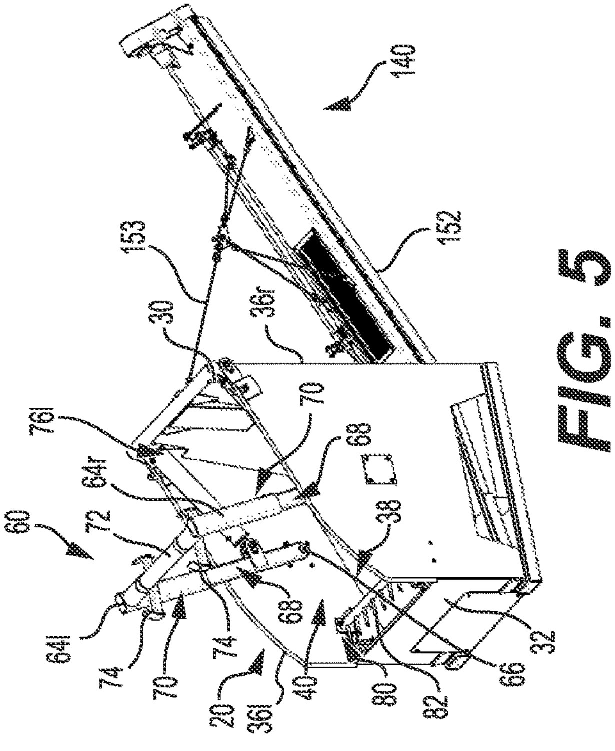
FIG. 5 is a perspective view taken from a top, front, left side of the emptying station of FIG. 1.
Figure 6:
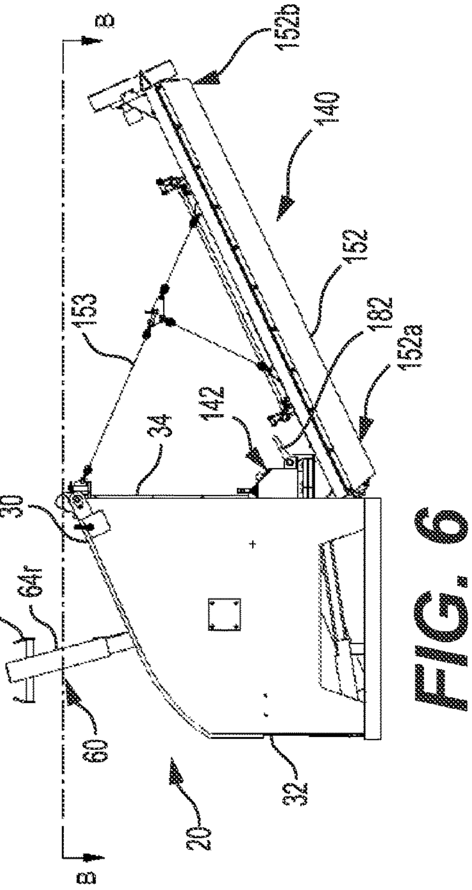
FIG. 6 is a left side elevation view of the emptying station of FIG. 1.
Figure 9:
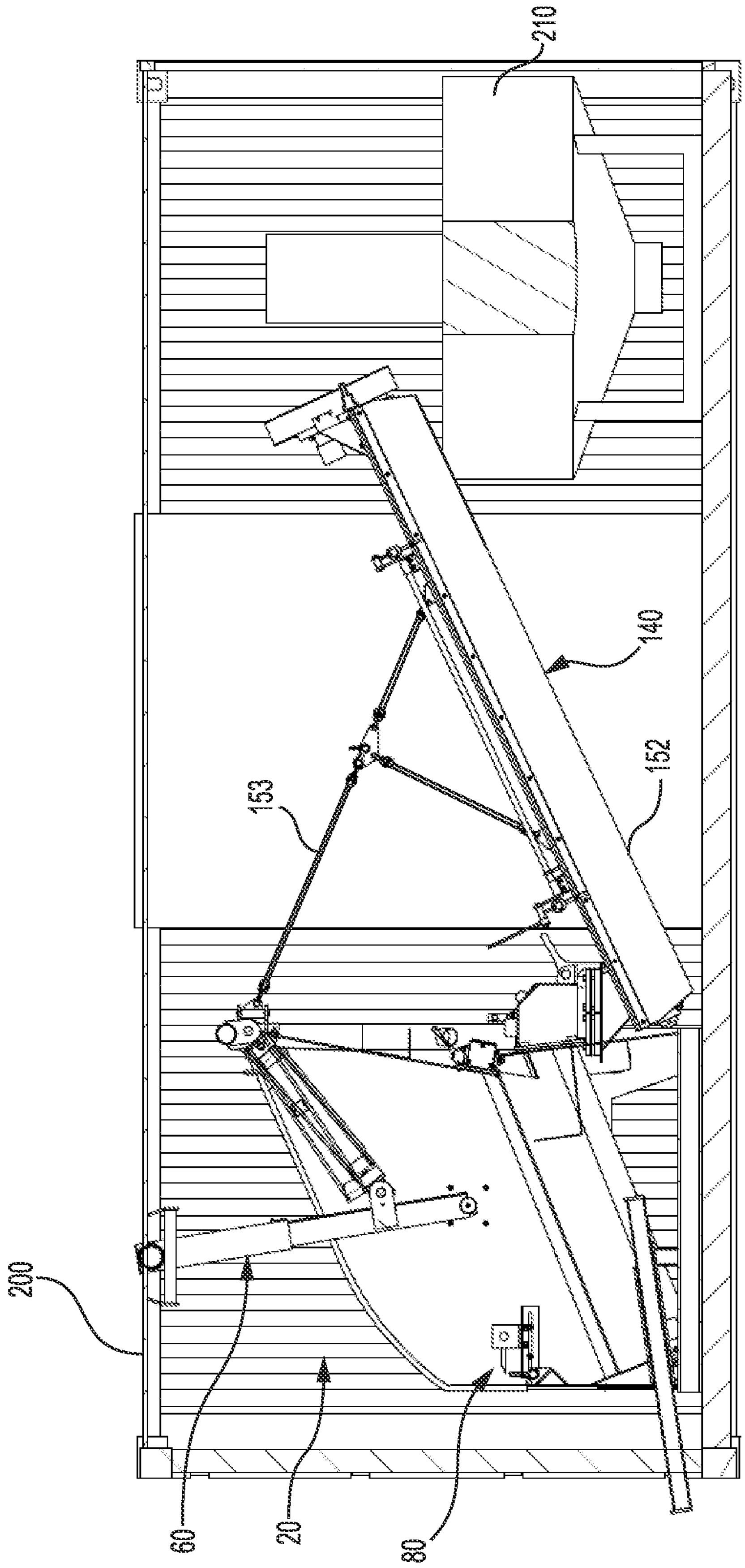
FIG. 9 is a longitudinal cross-sectional view of a shipping container containing the emptying station of FIG. 1 and a recipient.
Figure 12:
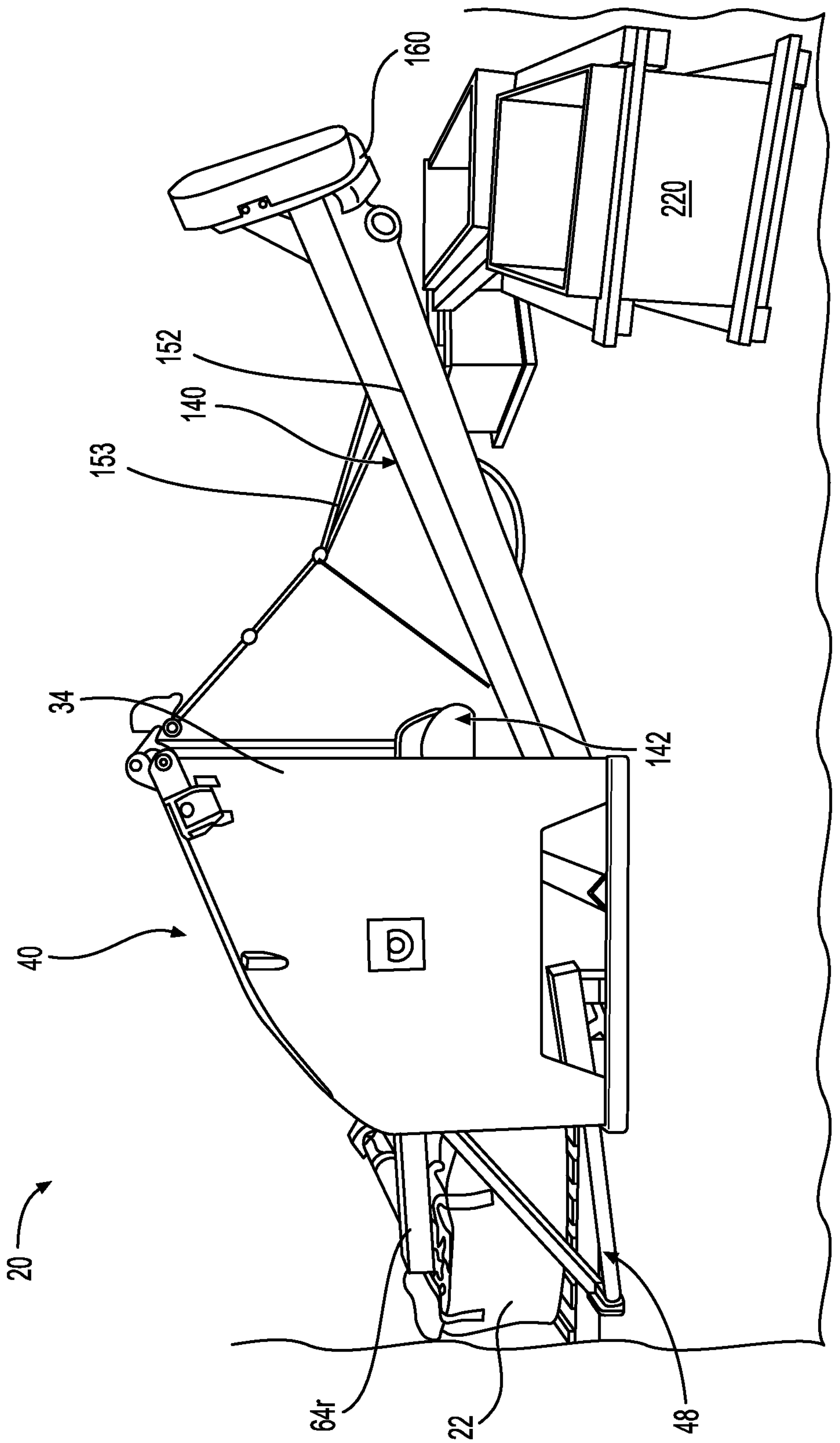
FIG. 12 is a left side elevation view of the emptying station of FIG. 1, with the lift assembly in a lowered position.

As best seen in FIGS. 2, 5 and 12, a loading area 48 is defined forward of the front wall 32. FIBCs 22 are positioned in the loading area 48 for being raised and lowered by the lift assembly 60, as shown by the double arrow 62 in FIG. 2. The lift assembly 60 includes left and right lift arms **64*l*, 64*r* pivotally connected to the left and right side walls 36*l*, 36*r* respectively at pivots 66. The lift arms 64*l*, 64*r* are structured for lifting the FIBC 22 from the loading area 48 to above and rearward the front wall 32, in the hopper 40. In FIG. 2, there is shown an embodiment of the lift arms 64*l*, 64*r* each having a proximal portion 68 and a distal portion 70. The proximal portion 68 and the distal portion 70 define a L-shape. The lift arms 64*l*, 64*r* are configured to reach a FIBC 22 positioned in the loading area 48 and raise the FIBC 22 to the raised position such that the overall height of the emptying station 20 is shorter than 9 feet tall (or about 2.74 meters tall), as indicated in FIG. 2. In the present implementation, the overall height of the emptying station 20 when the lift arms 64*l*, 64*r* are fully raised is 100⅞ inches (or about 2.56 meters). This height allows the lift assembly 60 of the emptying station 20 to operate in a standard 20-foot shipping container 200 (as shown in FIG. 9) or in environments that have relatively low ceilings, such as a mine gallery. It is also to be noted that, in the present embodiment, an overall length of the emptying station 20 from the front wall 32 to the nozzle 160 is of 168.875 inches (or about 4.29 meters). Thus the emptying station 20 can fit inside the container 200 and feed wet concrete to a concrete dispenser 210 also disposed inside the container 200**. Other dimensions are contemplated.

In FIGS. 1, 3 to 6 and 9, there is shown another embodiment of the lift arms **64*l*, 64*r* having the proximal and distal portions 68, 70 being straight. It is contemplated that the lift arms 64*l*, 64*r* could have different shape or structure in different embodiments. The lift assembly 60 could also use rotating discs instead of lift arms in other embodiments. In both illustrated embodiments, the distal portion 70 of the lift arms 64*l*, 64*r* is selectively extendible by about 12 inches (or about 30.5 centimeters). The length of the lift arms 64*l*, 64*r* can thus be selected depending on the type and weight of FIBC 22 to be lifted. In the illustrated embodiment, the emptying station 20 can handle FIBCs 22 weighing up to 1500 kilograms. A traverse 72 is interconnected between the distal portions 70 of the left and right lift arms 64*l*, 64*r*. Left and right hooks 74 are connected to the traverse 72. The hooks 74 are configured for engaging loops 26 (FIGS. 2 and 10) provided on the FIBC 22**.

The lift assembly 60 further includes left and right actuators **76*l*, 76*r* pivotally connected between the body 30 and the corresponding lift arm 64*l*, 64*r*. The left and right actuators 76*l*, 76*r* are driven by the hydraulic unit 50 (as schematically shown in FIG. 2). In the present embodiment, the actuators 76*l*, 76*r* are hydraulic actuators. It is contemplated that the hydraulic unit 50 could replaced by an electric motor, or a pneumatic device, and that the actuators 76***l*, 76*r* could be electrically or pneumatically driven. The actuators 76*l*, 76*r* are operable to lower or raise the lift arms 64*l*, 64*r* upon extension and retraction thereof.

Referring back to FIG. 2, when the lift arms 64*l*, 64*r* are lowered, the traverse 72 and the hooks 74 are located longitudinally forward of the front wall 32 in the loading area 48. An operator 49 can engage the loops 26 of the FIBC 22 to the hooks 74 and operate the actuators 76*l*, 76*r* to raise the lift arms 64*l*, 64*r*. When the lift arms 64*l*, 64*r* are raised, the FIBC 22, the traverse 72 and the hooks 74 pass above the front wall 32 and move longitudinally towards the rear wall 34.

Figure 10:
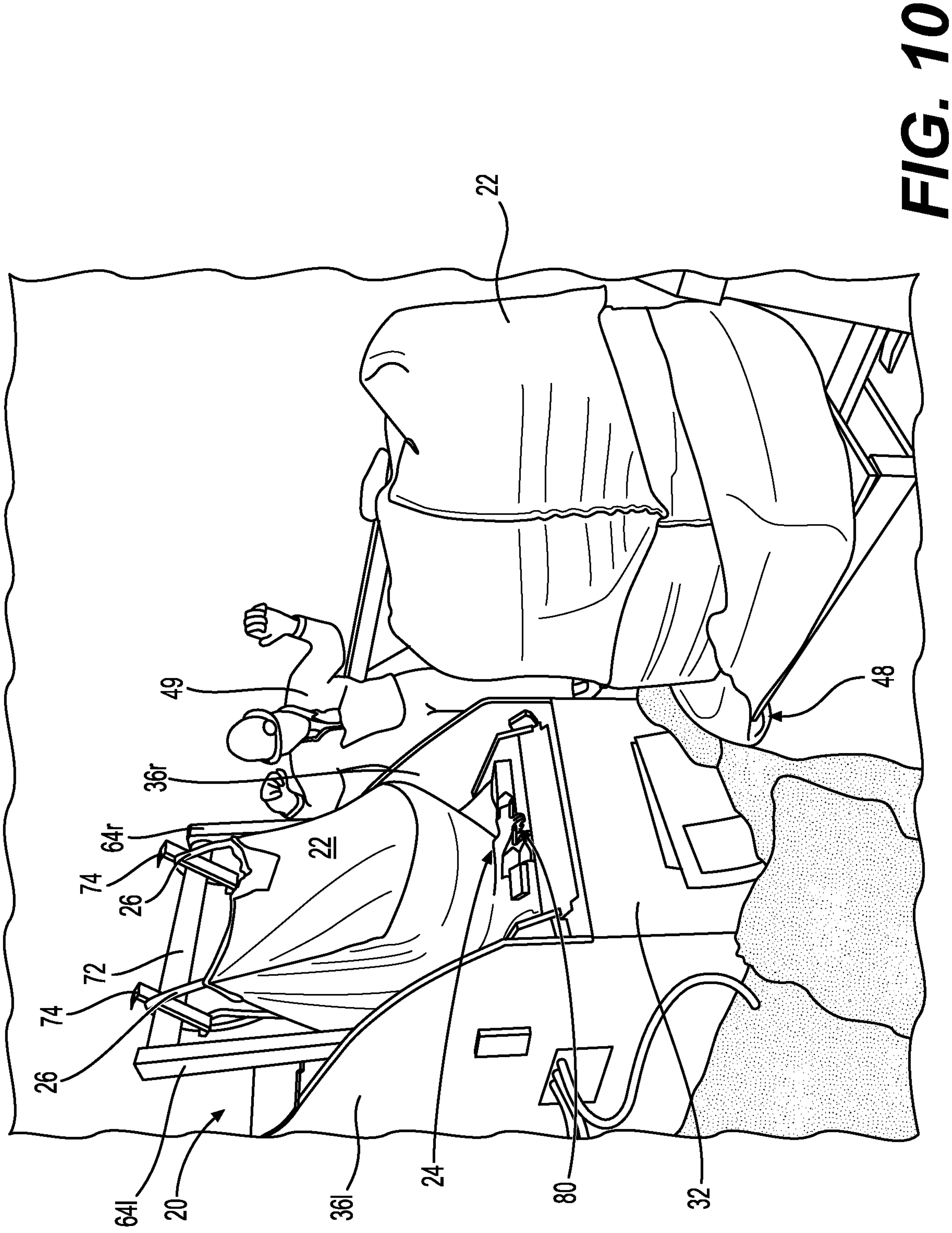
FIG. 10 is a perspective view taken from a top, front, right side of the emptying station of FIG. 1, with the lift assembly lifting a flexible intermediate bulk container in a raised position.
Figure 11:
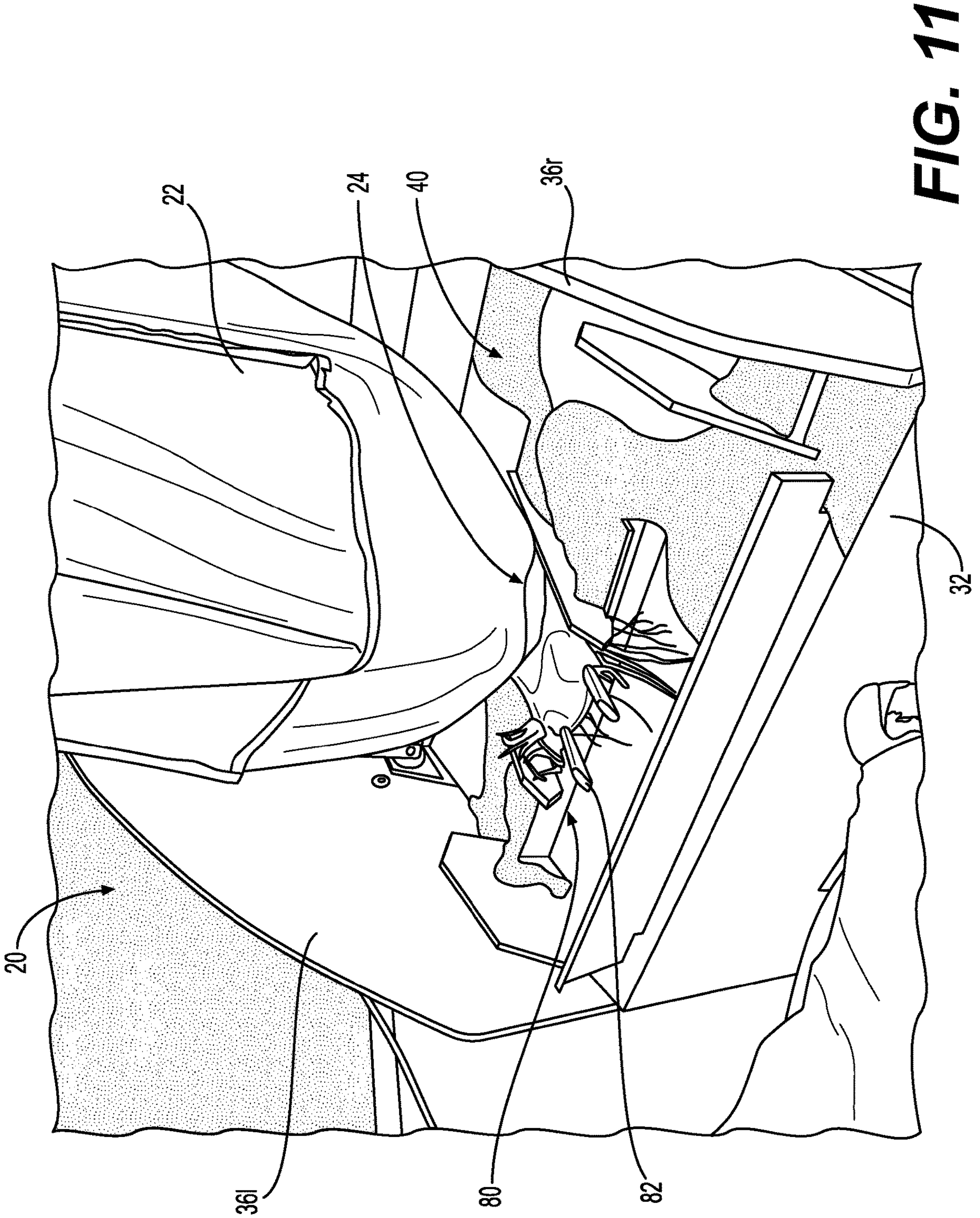
FIG. 11 is a close-up, perspective view taken from a top, front, left side of a cutter of the emptying station of FIG. 1 cutting open a bottom of a flexible intermediate bulk container.

Referring to FIGS. 5, 10 and 11, the cutter 80 will be described. The cutter 80 is positioned for cutting the bottom 24 of the FIBC 22 when moved longitudinally from forward of the front wall 32 to rearward of the front wall 32. In other words, the cutter 80 is positioned for cutting the bottom 24 of the FIBC 22 when moved longitudinally from the loading area 48 to the hopper 40. The cutter 80 includes a plurality of spikes 82 connected to the body 30 at the rear of the front wall 32. The plurality of spikes 82 extends generally horizontally and points toward the front wall 32. The plurality of spikes 82 is positioned such that, when the FIBC 22 is lifted up by the lift arms 64*l*, 64*r* and moves longitudinally towards the rear wall 34, the bottom 24 of the FIBC 22 is cut open (or ripped apart) by the plurality of spikes 82. In some embodiments, the position and the configuration of the plurality of spikes 82 can be selected depending on the type of FIBC 22 to empty.

It is to be noted that the cutter 80 is positioned for cutting open the bottom 24 of the FIBC 22 during the upward motion of the FIBC 22, allowing for the content of the FIBC 22 to begin to be emptied in the hopper 40 through gravity before the lift arms 64*l*, 64*r* reach the raised position (shown in FIG. 10). As the lift arms 64*l*, 64*r* continue lifting the FIBC 22 as they move toward the raised position, the FIBC 22 empties its content into the hopper 40.

Figure 8:
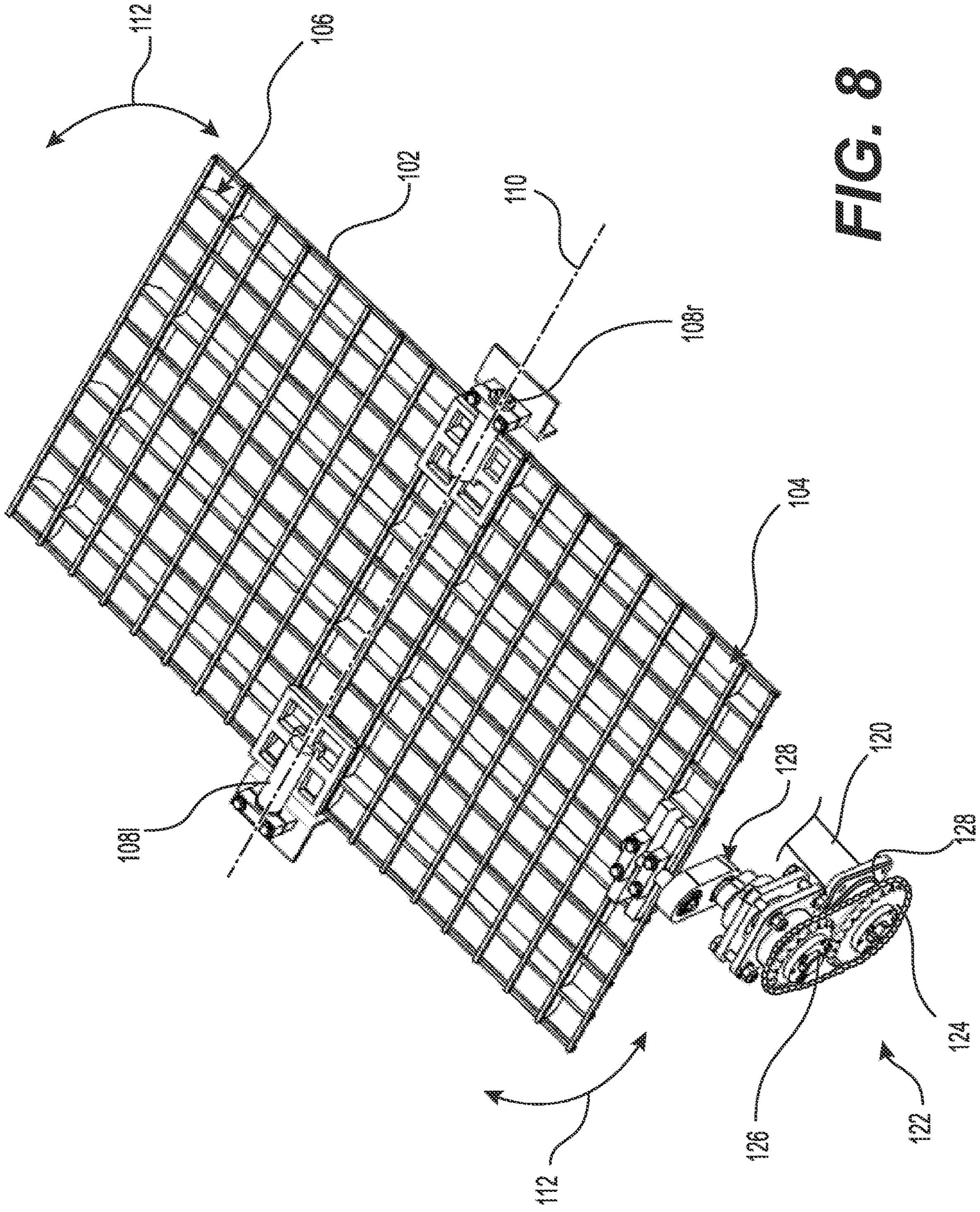
FIG. 8 is a perspective view taken from a top, front, left side of a vibrating screen of the emptying station of FIG. 1.

Referring now to FIGS. 1, 2 and 8, the dry mixer 100 will be described. The dry mixer 100 mixes the particulate matter received in the hopper 40 so as to have a homogenous distribution of the concrete constituents therein. The dry mixer 100 includes a vibrating screen 102 located in the hopper 40 and above the trough 42. The vibrating screen 102 is indirectly driven by the hydraulic unit 50, and the operative connection therebetween will be described below. The vibrating screen 102 is made of a grid of metallic material and is used to sift the particulate matter, and to break down lumps or large particles into smaller pieces. The vibrating screen 102 covers a majority of the bottom region of the hopper 40. As best seen in FIG. 8, the vibrating screen 102 has a front portion 104 and a rear portion 106, and left and right pivots 108*l*, 108*r* disposed longitudinally between the front and rear portions 104, 106. The left and right pivots 108*l*, 108*r* define a laterally extending pivot axis 110. The left and right pivots 108*l*, 108*r* pivotally connect the vibrating screen 102 to the body 30, and the front and rear portions 104, 106 are pivotable upwardly and downwardly about the pivot axis 110 as shown by the double arrows 112 in FIG. 8.

As best seen in FIG. 2, the vibrating screen 102 is also slanted upwardly from the front wall 32 to the rear wall 34 of the body 30. In the present embodiment, the vibrating screen 102 defines a plane 114 (FIG. 2). When the vibrating screen 102 is in a neutral position (shown in FIG. 2) about the pivot axis 110 (i.e. the front portion 104 and the rear portion 106 are at midcourse between their extreme upward and downward positions), the plane 114 is angled by about 30 degrees relative to a flat ground surface, but the angle could differ in other embodiments.

The dry mixer 100 further includes a screw 120 extending in the trough 42. The screw 120 is driven by a hydraulic motor 52 driven by the hydraulic unit 50 (as schematically shown in FIG. 2). A drive assembly 122 (FIG. 8) is connected to the screw 120 and makes the screen 102 vibrate. The drive assembly 122 includes an input sprocket 124, an output sprocket 126, a chain 128 interconnecting the input sprocket 124 to the output sprocket 126, a shaft (not shown) connected to the output gear 126, and a cam assembly 128 connected to the shaft and being configured to move the front portion of the 104 of the screen 102 up and down as the screw 120 rotates. Other drive assemblies could be used to make the screen 102 vibrate.

Referring back to FIG. 2, the screw 120 is also slanted upwardly from the front wall 32 to the rear wall 34 of the body 30. The screw 120 defines a screw axis 130. The screw axis 130 is parallel to the plane 114 when the vibrating screen 102 is in the neutral position. The screw 120 has a flight diameter of 6 inches (or 15.24 centimeters), and a pitch (i.e. spacing between adjacent flights) of 4 inches (or 10.16 centimeters). Other configurations of the screw 120 could be used in other embodiments. The configuration and rotation speed of the screw 120 is selected to keep an appropriate amount of particulate matter in the dry mixer 100 during continuous operation (i.e. when several FIBCs 22 are emptied one after the other by the emptying station 20). In the present embodiment, the dry mixer 100 is configured to be continuously operated when the screw 120 has a rotation speed comprised between 50 and 120 rpm.

The combined action of the slanted vibrating screen 102 and screw 120 has been found (i) to reduce compaction of the particulate matter in the trough 42 as it is moved from the front end of the screw 120 to the rear end of the screw 120, and (ii) to promote homogenous distribution and mixing of particulate matter at the rear end of the screw 120, which extends in the aperture 35 defined in the rear wall 34. Therefore, the particulate matter flowing from the dry mixer 100 and on to the wet mixer 140 is ready to be mixed with water for forming wet concrete.

Figure 3:
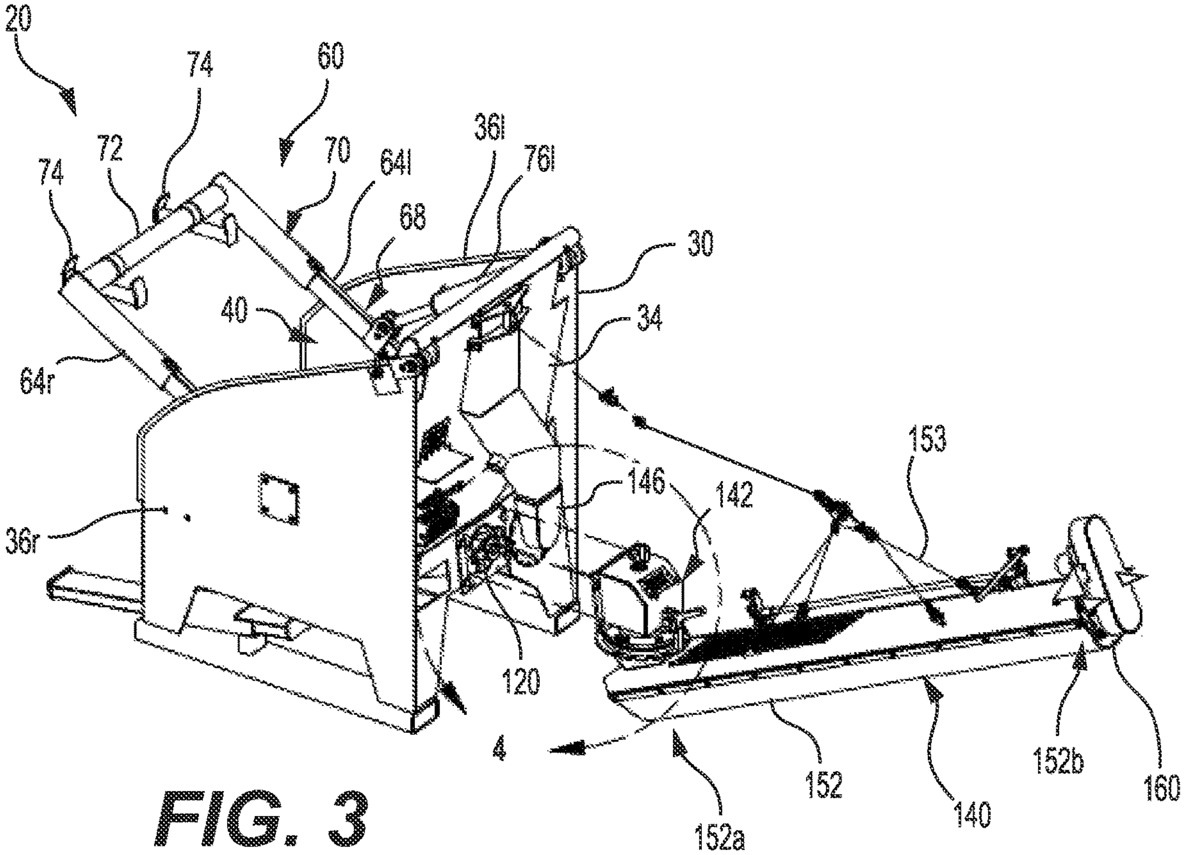
FIG. 3 is a perspective view taken from a top, rear, left side of the emptying station of FIG. 1, with a second mixer being disconnected.
Figure 4:
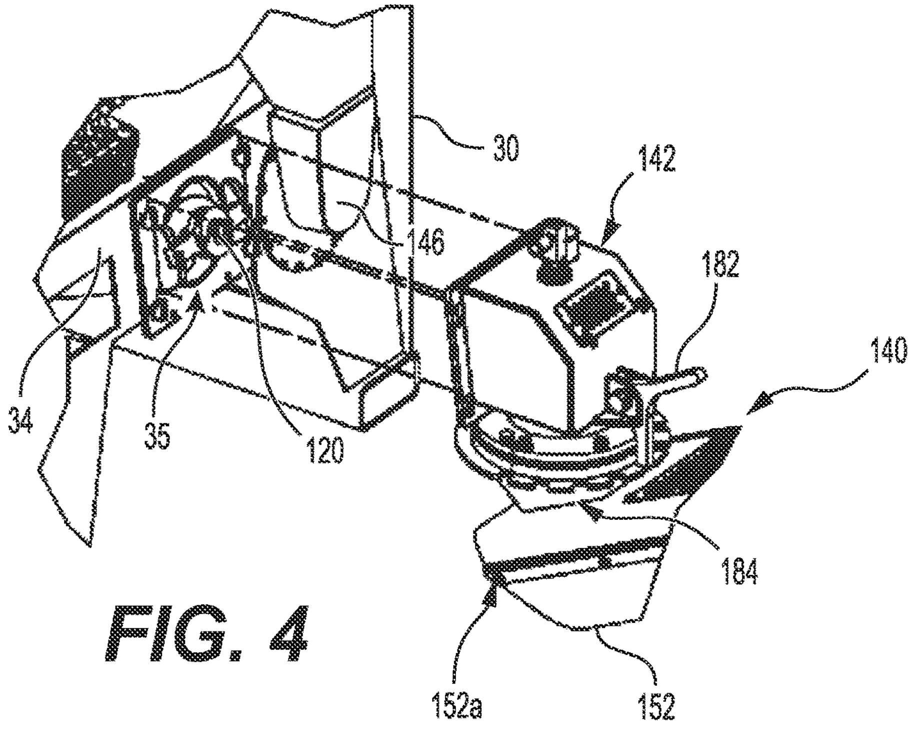
FIG. 4 is a close-up view of portion 4 of FIG. 3.

Referring now to FIGS. 2 to 4, the wet mixer 140 will be described. At the rear end of the screw 120, the mixed, dry particulate matter flows through the aperture 35 defined in the rear wall 34 into a collector 142 connected to the rear wall 34 of the body 30. The collector 142 defines a chamber 144 that directs the particulate matter into an inlet 150 of a conduit 152. The collector 142 includes a dust extractor 146 (FIG. 4) that is fluidly connected to the chamber 144. The dust extractor 146 reduces the amount of dust that is generated by the dry mixer 100.

Still referring to FIGS. 2 to 4, the conduit 152 is connected to the body 30 through the collector 142. The conduit 152 extends away from the rear wall 34 and is also slanted upwardly from a front end 152*a* to a rear end 152*b* thereof. The conduit 152 is also angled by about 30 degrees relative to a flat ground surface. The conduit 152 is supported by cables 153 that are connected to the body 30. The conduit 152 includes the nozzle 160 at the rear end 152*b* thereof. The nozzle 160 is used to pour the wet concrete into the concrete dispenser 210 (FIG. 9), a mold 220 (FIG. 12) or directly at a desired location. The nozzle 160 is at a height of about 48 inches (or about 121.92 centimeters) from the ground surface.

A screw 170 extends in the conduit 152 and is also slanted upwardly from the inlet 150 to the nozzle 160. The screw 170 further mixes the particulate matter received in the conduit 152 through the inlet 150 and conveys the particulate matter from the inlet 150 to the nozzle 160. A water injection port 174 (schematically shown in FIG. 2) is located at about 16 inches (or about 41.64 cm) from the front end 152*a* of the conduit 152. The water injection port 174 is thus located nearer to the inlet 150 than to the nozzle 160. The water injection port 174 introduces water from a water source into the wet mixer 140. The positioning of the water injection port 174 and the flow rate of water are selected such that, as dry, mixed particulate matter is carried by the screw 170 from the inlet 150 to the nozzle 160, water mixes with the dry, mixed particulate matter at a location along the conduit 152 that prevents water from accumulating at the front end 152*a* of the conduit 152 (which is also the lower end of the wet mixer 140). This way, the mixing of the particulate matter with water is performed between the inlet 150 and the water injection port 174, and upward of the water injection port 164.

The screw 170 has flights of 9 inches (or 22.86 centimeters) in diameter, and a pitch of 9 inches (or 22.86 centimeters). The configuration and size of the screw 170 and the conduit 152 surrounding the screw 170 are selected to promote adequate mixing of the particulate matter with water and the conveying of the wet concrete to the nozzle 160. The screw 170 is driven by a second hydraulic motor 176 (as schematically shown in FIG. 2). In other embodiments, the screw 170 could be driven by the hydraulic unit 50.

Figure 7:
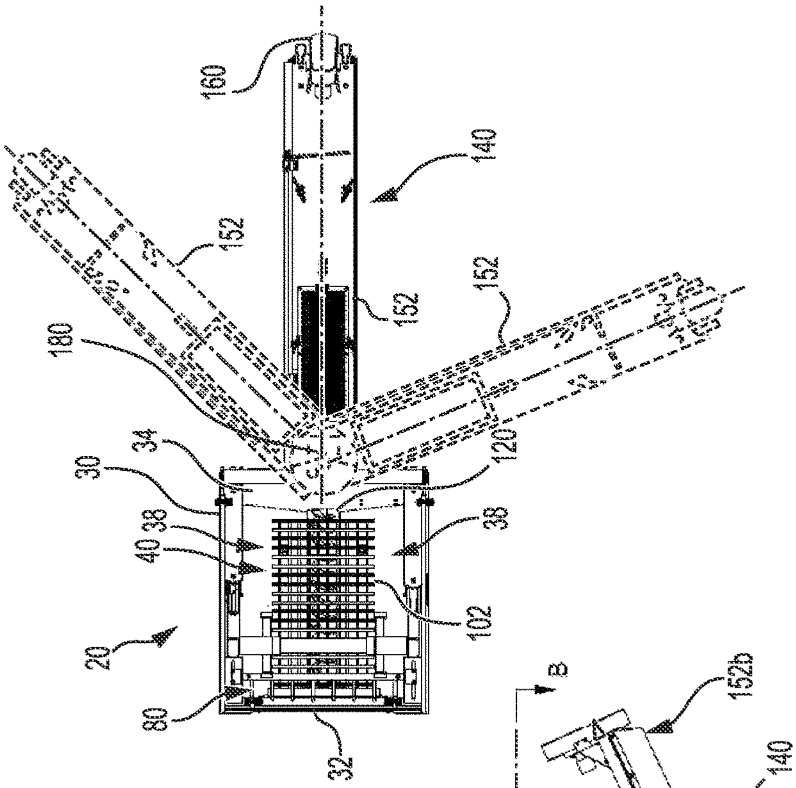
FIG. 7 is a cross-sectional view of the emptying station of FIG. 1 taken along cross-section line B-B of FIG. 6.

Referring to FIGS. 2 and 7, the wet mixer 140 is pivotable relative to the body 30 about a vertically extending pivot axis 180. More particularly, the collector 142 defines a pivot between the body 30 and the conduit 152. The conduit 152 is pivotable about the pivot axis 180 by about +/−45 degrees relative to the body 30 (as shown in phantom lines in FIG. 7), which offers flexibility during the pouring of the concrete. A lever 182 is connected between the collector 142 and the conduit 152 and is insertable into slots 184 (FIG. 1) defined in the conduit 152 corresponding to predetermined pivot angles.

The illustrated emptying station 20 is capable of lifting a FIBC 22 from the lowered position to the raised position in about 30 seconds, and the emptying station 20 lowers the FIBC 22 from the raised position back into the lowered position in about 30 seconds. The emptying station 20 is capable of emptying one FIBC 22 every two minutes, which provides a wet concrete feeding rate that is appreciable in the context of continuous concrete pouring operations.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. An emptying station for a flexible intermediate bulk container, comprising:

a body having a front wall, a rear wall defining an aperture, and left and right side walls extending longitudinally between the front and rear walls, the front wall, the rear wall and the left and right side walls collectively defining a hopper for receiving particulate matter contained in the flexible intermediate bulk container;

at least one power source connected to the body;

a lift assembly operatively connected to the at least one power source and to the body, the lift assembly moving the flexible intermediate bulk container relative to the body between a lowered position and a raised position;

a cutter connected to the body and being disposed in the hopper, the cutter being positioned for cutting a bottom of the flexible intermediate bulk container as the flexible intermediate bulk container is moved from the lowered position to the raised position; and at least one mixer connected to the body for mixing the particulate matter received in the hopper, the at least one mixer further conveying the particulate matter towards the rear wall.

2. The emptying station of claim 1, wherein the cutter is positioned for cutting the bottom of the flexible intermediate bulk container as the flexible intermediate bulk container is moved longitudinally from forward of the front wall to rearward of the front wall.

3. The emptying station of claim 1, wherein the cutter includes a plurality of spikes extending generally horizontally and being disposed at a rear of the front wall, the plurality of spikes pointing towards the front wall.

4. The emptying station of claim 1, wherein at least one of the rear wall, the right side wall and the left side wall extends vertically higher than the front wall.

5. The emptying station of claim 1, wherein the at least one mixer includes a vibrating screen located in the hopper, the vibrating screen being operatively connected to the at least one power source.

6. The emptying station of claim 5, wherein the vibrating screen has a front portion and a rear portion, and at least one pivot disposed longitudinally between the front and rear portions, the at least one pivot defining a laterally extending pivot axis, the at least one pivot pivotally connecting the vibrating screen to the body, and the front and rear portions being pivotable upwardly and downwardly about the pivot axis.

7. The emptying station of claim 5, wherein the vibrating screen is slanted upwardly from the front wall to the rear wall of the body.

8. The emptying station of claim 1, wherein the at least one mixer includes a first mixer having a first screw being slanted upwardly from the front wall to the rear wall of the body, the first screw extending at least partially in the aperture defined in the rear wall, and the emptying station further includes a second mixer located at the rear of the rear wall, the second mixer including:

a conduit connected to the body and extending away from the rear wall, the conduit including an inlet and a nozzle, and a second screw extending in the conduit and being slanted upwardly from the inlet to the nozzle, the second screw further mixing the particulate matter received in the conduit through the inlet and conveying the particulate matter from the inlet to the nozzle.

9. The emptying station of claim 8, wherein the first screw has a first pitch and the second screw has a second pitch, the second pitch being different of the first pitch.

10. The emptying station of claim 8, wherein the first screw has a first flight diameter and the second screw has a second flight diameter, the second flight diameter being different of the first flight diameter.

11. The emptying station of claim 8, wherein the second mixer includes a water injection port located nearer to the inlet than to the nozzle.

12. The emptying station of claim 8, wherein the at least one power source includes a first motor and a second motor, the first motor driving the first mixer and the lift assembly, and the second motor driving the second mixer.

13. The emptying station of claim 8, wherein the second mixer further has a collector connected to the rear wall of the body, the collector defining a chamber for receiving particulate matter flowing through the aperture defined in the rear wall and for directing the particulate matter into the inlet of the conduit, the collector further including a dust extractor fluidly connected to the chamber.

14. The emptying station of claim 8, wherein the second mixer is selectively pivotable relative to the body about a vertically extending pivot axis.

15. The emptying station of claim 1, wherein the lift assembly includes:

at least one lift arm pivotally connected to the body and structured for lifting the flexible intermediate bulk container in the hopper from forward of the front wall to above and rearward of the front wall; and at least one actuator pivotally connected between the at least one lift arm and the body, the at least one actuator being driven by the at least one power source.

16. The emptying station of claim 15, wherein the at least one lift arm has a proximal portion and a distal portion, and the distal portion is selectively extendible relative to the proximal portion.

17. The emptying station of claim 16, wherein the proximal portion and the distal portion define an L-shape.

18. The emptying station of claim 16, wherein the distal portion includes at least one hook for engaging at least one loop of the flexible intermediate bulk container.

19. The emptying station of claim 15, wherein the at least one lift arm includes a left lift arm and a right lift arm, and the at least one actuator includes a left actuator and a right actuator, the left actuator being pivotally connected between the left side wall and the left lift arm, and the right actuator being pivotally connected between the right side wall and the right lift arm.

20. A shipping container containing the emptying station of claim 1.

21. An emptying station for a flexible intermediate bulk container, comprising:

a body having a front wall, a rear wall defining an aperture, and left and right side walls extending between the front and rear walls, the front wall, the rear wall and the left and right side walls collectively defining a hopper for receiving particulate matter contained in the flexible intermediate bulk container;

at least one power source connected to the body;

a lift assembly operatively connected to the at least one power source and to the body, the lift assembly moving the flexible intermediate bulk container relative to the body between a lowered position and a raised position;

a cutter connected to the body and being disposed in the hopper, the cutter being positioned for cutting a bottom of the flexible intermediate bulk container as the flexible intermediate bulk container is moved from the lowered position to the raised position; and at least one mixer connected to the body for mixing the particulate matter received in the hopper, the at least one mixer further conveying the particulate matter towards the rear wall, the at least one mixer being slanted upwardly from the front wall to the rear wall of the body.

22. The emptying station of claim 21, wherein the at least one mixer further comprises a vibrating screen located in the hopper and being slanted upwardly from the front wall to the rear wall of the body.

23. The emptying station of claim 22, wherein the at least one mixer includes a first mixer having a first screw being slanted upwardly from the front wall to the rear wall of the body, the first screw extending at least partially in the aperture defined in the rear wall, and the emptying station further includes a second mixer located at the rear of the rear wall, the second mixer including:

a conduit connected to the body and extending away from the rear wall, the conduit including an inlet and a nozzle, and a second screw extending in the conduit and being slanted upwardly from the inlet to the nozzle, the second screw further mixing the particulate matter received in the conduit through the inlet and conveying the particulate matter from the inlet to the nozzle.

24. The emptying station of claim 23, wherein the vibrating screen defines a plane, the first screw defines a first screw axis, and the first screw axis is parallel to the plane.

25. The emptying station of claim 23, wherein the first mixer is a dry mixer, and the second mixer is a wet mixer.

* * * * *